United States Patent [19]

Bogardus, Jr. et al.

[11] Patent Number: 4,462,787
[45] Date of Patent: Jul. 31, 1984

[54] CANTILEVERED MANDREL ASSEMBLY

[76] Inventors: Carl R. Bogardus, Jr., 3224 Lamp Post La., Oklahoma City, Okla. 73120; Lawrence C. Thompson, 6708 NW. 27 St., Bethany, Okla. 73008

[21] Appl. No.: 462,987

[22] Filed: Feb. 1, 1983

[51] Int. Cl.³ .............................. B29C 13/04
[52] U.S. Cl. ...................... 425/402; 249/179; 249/185; 425/110; 425/403; 425/471; 425/DIG. 14
[58] Field of Search ............ 249/179, 178, 152, 153, 249/185; 425/368, 393, 403, 468, 469, 471, 402, 438, 440, 442, DIG. 14, 110, 115

[56] References Cited

U.S. PATENT DOCUMENTS

| 76,672 | 4/1868 | Sutherland | 249/185 |
|---|---|---|---|
| 859,681 | 7/1907 | Morris | 249/179 |
| 904,033 | 11/1908 | Weldon | 249/185 |
| 931,351 | 8/1909 | Tingley | 249/185 |
| 1,146,263 | 7/1915 | Keller | 249/179 |
| 2,878,545 | 3/1959 | Lowe | 249/179 |
| 2,929,125 | 3/1950 | McGinnis et al. | 249/185 |
| 3,656,732 | 4/1972 | St. John | 249/179 |
| 4,225,302 | 9/1980 | Brooks et al. | 425/471 |
| 4,233,020 | 11/1980 | Oswald | 425/471 |
| 4,278,490 | 7/1981 | Pistole et al. | 249/179 |

Primary Examiner—Jay H. Woo
Assistant Examiner—Tinker R. McBrayer
Attorney, Agent, or Firm—Shlesinger, Arkwright, Garvey & Fado

[57] ABSTRACT

A rotatable mandrel for making cylindrical molded articles has a plurality of aligned identical and collapsible cylindrical mandrel sections supported upon a cantilevered shaft, the cylindrical sections having a truss supported relatively thin exterior wall and retractable segment to permit circumferential contraction of the wall, the composite segmental cylindrical segment being supported by a central cantilevered rotatable shaft in turn supported by a rotatable bearing assembly on a vertical support tower, the collapsible contraction of the composite cylindrical mandrel being controlled by internally mounted power units connected to the retractable segment and the other portions of the cylindrical mandrel sections.

12 Claims, 7 Drawing Figures

CANTILEVERED MANDREL ASSEMBLY

This invention relates to rotatable mandrels for forming cylindrically shaped molded articles thereon and more particularly to a plurality of collapsible modular mandrel sections supported for rotation upon a cantilevered shaft wherein the individual modular mandrel sections are integrally connected and aligned with each other so as to form a continuous elongated mandrel unit having a continuous, thin-walled, collapsible exterior molding surface.

BACKGROUND OF THE INVENTION

In the production of cylindrical tanks or other similar vessels, a fiber reinforced thermo-setting resin is usually applied to the exterior surface of a rotating mandrel and allowed to harden thereon. In mandrels having longitudinally slit shells, the process of removing the subsequently molded vessel from the shell has been accomplished by reducing the exterior diameter of the shell by means of power actuated cylinders or the like. These devices operate to force the normally mated longitudinally slitted edges into a second position whereby the edges are caused to overlap each other. A mandrel of the above type is shown by Lowe, U.S. Pat. No. 2,878,545; St. John, U.S. Pat. No. 3,656,732; Oswald, U.S. Pat. No. 4,233,020 and Pistole, U.S. Pat. No. 4,278,490. Each discloses longitudinally slit collapsible mandrels, of the type referred to above but having somewhat modified design characteristics. Brooks, U.S. Pat. No. 4,225,302 discloses a tank forming mandrel which is not collapsible but which includes a tapered outer molding surface for facilitating the removal of the article molded thereon. Keller, U.S. Pat. No. 1,146,263 and Morris, U.S. Pat. No. 859,681 disclose other molding apparatus comprising individual mold sections which are connected with each other so as to form elongated molding units.

There presently exists a need for a mandrel having the combined features of modular construction and collapsibility as well as structural integrity. Furthermore, such a device should afford replication of tanks or similar articles which meet exacting design specification requirements.

SUMMARY AND OBJECTS OF THE INVENTION

The present invention provides a mandrel and a support therefor comprising a plurality of collapsible modular mandrel sections mounted for rotation upon a cantilevered shaft wherein the modular mandrel sections are internally reinforced in a manner so as to provide structural integrity. The individual mandrel sections when positioned upon the shaft are aligned with one another and integrally connected so as to form an elongated mandrel unit having an external molding surface of continuous length. The modular design facilitates handling and transporting of the disassembled mandrel unit from the location of manufacture to the location of subsequent use.

The support for the mandrel includes a base frame and a support tower connected to the base frame whereby the cantilevered shaft is supported for rotation by means of a special bearing assembly positioned within the upper portion of the support tower. This bearing arrangement provides means for carrying and transferring the entire weight of the cantilevered shaft and mandrel supported thereon through the support tower to the base frame.

The modular mandrel sections are of unique construction in that they comprise three distinct segments, namely, a support cylinder half section, a secondary cylinder half section and a pivotal door interconnecting the two half sections. This segmented construction allows the modular sections to be collapsed in a manner far superior to that of the prior art.

It is therefore an object of this invention to provide a collapsible mandrel.

It is another object of the present invention to provide a mandrel having modular construction.

It is a further object of the present invention to provide a mandrel which is easily handled and transported.

A still further object of this invention is to provide a cantilevered mandrel assembly having improved support means.

A still further object of this invention is to provide a mandrel having superior structural integrity.

A still further object of this invention is to provide a mandrel capable of producing molded articles of varying length.

A still further object of this invention is to provide a mandrel having improved means for facilitating removal of the articles subsequently formed thereon.

A still further object of this invention is to provide a mandrel which may be economically produced.

The foregoing and other objects and advantages of this invention will appear from the following detailed description taken in connection with the accompanying drawings, in which:

FIG. 6 is a fragmentary perspective view of an alternative embodiment of the door unit shown in FIG. 4 in its closed position.

DETAILED DESCRIPTION OF THE DRAWINGS

Figure 1:
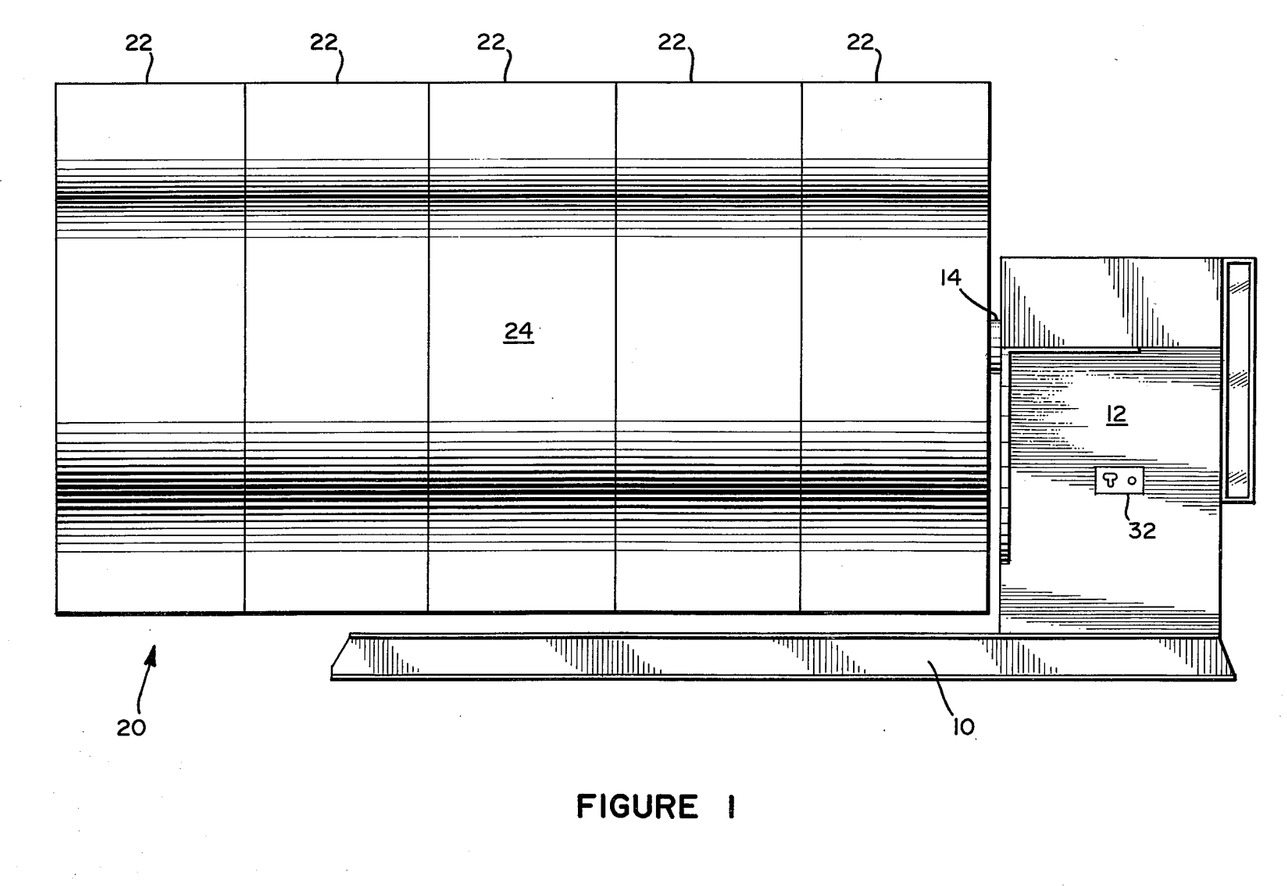
FIG. 1 is a side elevational view of the assembled modular mandrel sections and the supporting apparatus therefore.
Figure 2:
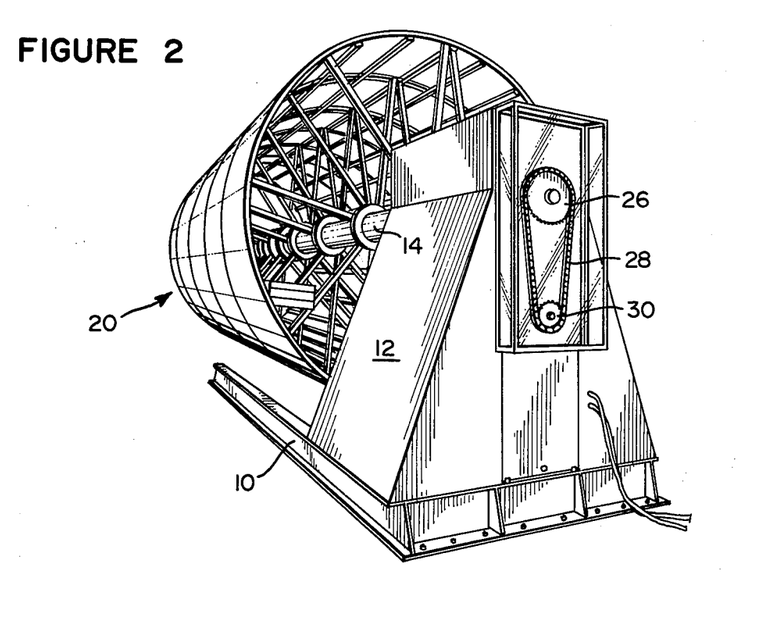
FIG. 2 is a perspective view of the apparatus shown in FIG. 1 showing the internal reinforcing elements of the mandrel unit as well as the power drive means.

FIGS. 1 and 2

FIGS. 1 and 2 show a base frame 10 and a vertical support tower 12 connected at its lower end portion to base frame 10. Base frame 10 is preferably of I-beam construction. One end of a cantilevered shaft 14 is supported for rotation within the upper end portion of vertical support tower 12 and extends therefrom horizontally above and in a direction parallel to the longitudinal axis of base frame 10. A mandrel unit 20 is supported upon cantilevered shaft 14 for rotation therewith. Mandrel unit 20 comprises a plurality of identical, cylindrically shaped, longitudinally short modular mandrel sections 22 which are interconnected so as to form a continuous exterior molding surface 24. Cantilevered shaft 14 is supported for rotation by means of a special bearing assembly which will be more fully discussed in conjunction with FIG. 7. A sprocket 26 is keyed to the proximal end of cantilevered shaft 14 and is connected by means of belt 28 to a second sprocket 30 which is driven by a motor (not shown) housed within vertical support tower 12. A manually operated motor control panel 32 is located on the side of vertical support tower 12 for controlling the motor drive unit. Manual control panel 32 is easily accessible to the operator and allows the operator to stand clear of any moving parts of the mandrel assembly.

Figure 3:
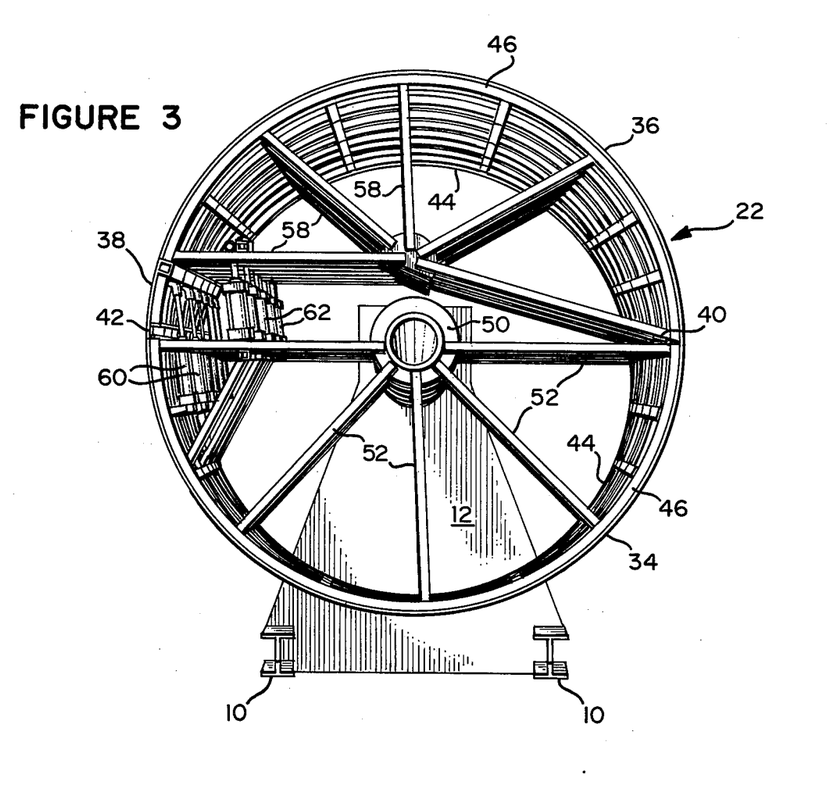
FIG. 3 is a perspective view showing one of the assembled modular mandrel sections supported upon the cantilevered shaft prior to its interconnection with adjacent modular mandrel sections.
Figure 4:
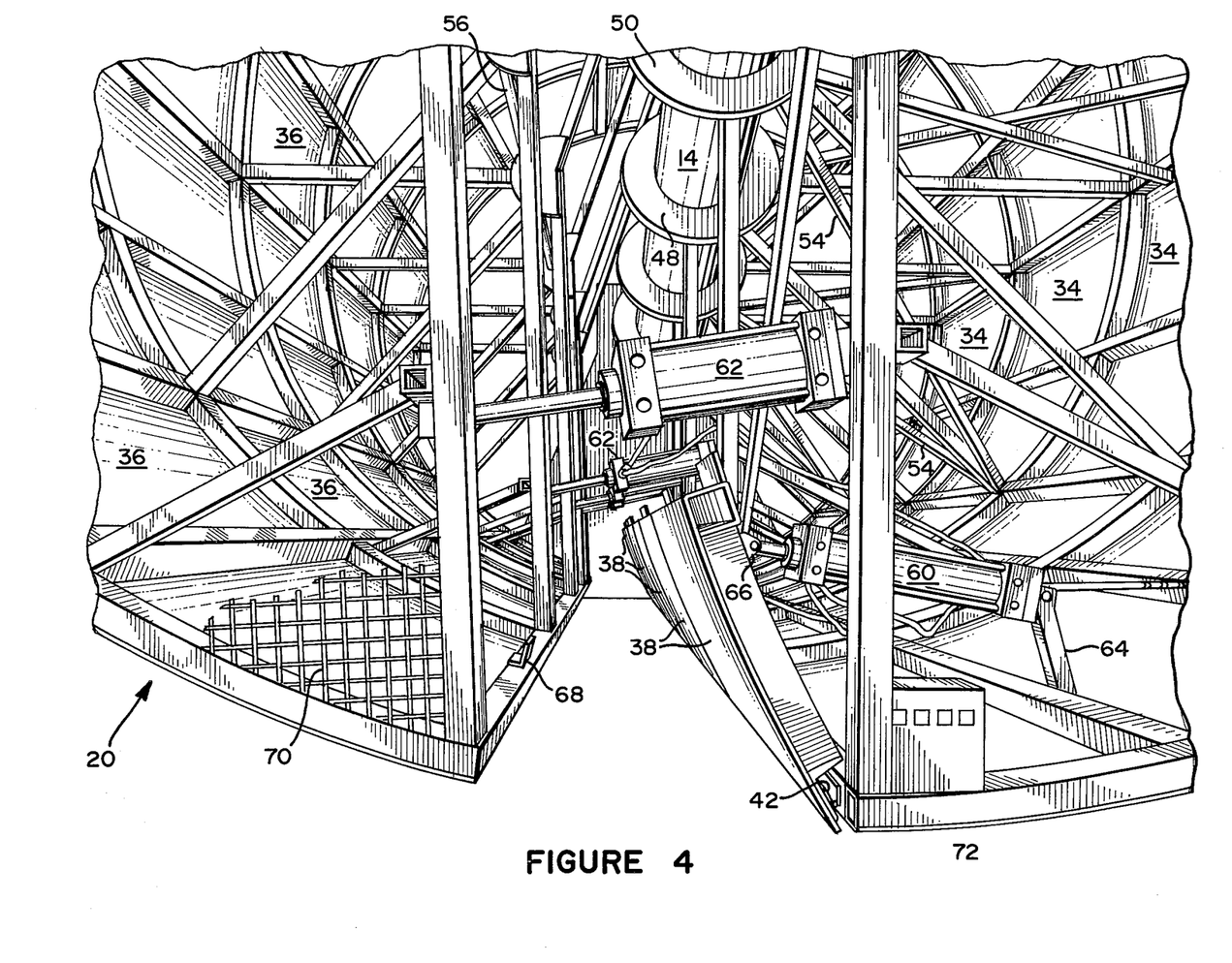
FIG. 4 is a fragmentary perspective view showing the door section of FIG. 3 in its opened position, and showing the interior reinforcing elements of the mandrel unit as well as the power cylinder units.

FIGS. 3 and 4

FIG. 3 shows a modular mandrel section 22 supported upon cantilevered shaft 14. Modular mandrel section 22 is comprised of three distinct arcuate shaped sections, namely, a support cylinder half section 34, a secondary cylinder half section 36, and a pivotal door section 38 interconnecting support cylinder half section 34 with secondary cylinder half section 36. Pivotal door section 38 is shown in its closed position, thus, modular mandrel section 22 is in its fully expanded condition. Secondary cylinder half section 36 is connected to support cylinder half section 34 by means of hinge 40. The pivoted door 38 is supported on section 34 by hinge 42, thus allowing door section 38 to have inward pivotal movement toward cantilevered shaft 14.

Support cylinder half section 34, secondary cylinder half section 36 and pivotal door section 38 each includes opposite side edges 44 and 46. Support cylinder half section 34 includes a pair of centrally located concentric rings 48 and 50 which support the entire weight of modular mandrel section 22 upon cantilevered shaft 14. Pairs of spokes 52 extend radially from concentric rings 48 and 50 to side edges 44 and 46, respectively, thereby providing structural reinforcement. Interconnecting each pair of spokes 52 are trusses 54 for increasing stability. Spokes 52 are of identical length.

Secondary cylinder half section 36 includes an off-centered support bar 56 and a plurality of paired secondary spokes 58 extending from opposite ends of support bar 56 to respective side edges 44 and 46. Since support bar 56 is off-centered, no two pairs of secondary spokes 58 are of equal length.

Means for collapsing and expanding modular mandrel section 22 are provided in the form of a first power cylinder unit 60 and a second power unit 62 whose function will be more fully described in conjunction with FIG. 4.

Referring now to FIG. 4, a plurality of modular mandrel sections, each of which is comprised of a support cylinder half section 34, a secondary cylinder half section 36 and a pivotal door section 38, are interconnected by welding or other suitable means along their adjacent edges and longitudinally aligned with each other so as to form a continuous mandrel unit. Concentric rings 50 are welded to cantilevered shaft 14 to support the weight of the mandrel unit thereon and to allow rotation of the mandrel unit with cantilevered shaft 14.

Each modular mandrel section includes a first power cylinder unit 60 for controlling pivotal movement of its respective door section 38. For the sake of clarity, only one first power cylinder unit 60 is shown. Beam members 64 are secured to support cylinder half sections 34 and support one end of each first power cylinder unit 60. The opposite ends of first power cylinder unit 60 are connected to respective door sections 38 by means of clevis and pin arrangements 66.

Each modular mandrel section includes a second power cylinder unit 62 which interconnects opposing support cylinder half sections 34 and secondary cylinder half sections 36. Second power cylinder units 62 allow secondary cylinder half sections 36 to be collapsed toward, or expanded from support cylinder half sections 34. Second power cylinder units 62 are simultaneously activated. Likewise, first power cylinder units 60 are simultaneously activated.

Suitable locking means may be provided for maintaining pivotal door sections 38 in their closed position. For example, door sections 38 may be provided with solenoid actuated sliding bolt arrangements (not shown), while adjacent edges of secondary cylinder half section 36 may be provided with bolt receiving members 68 (one shown) for receiving the sliding bolts. Obviously, the solenoids (not shown) could be replaced by other types of power cylinder units, for example, pneumatic actuators.

Additionally, a prefabricated bottom shell or end cap (not shown) could be mounted on the distal or open end of the mandrel unit to be subsequently fused with the tank body during the molding operation. Such an end cap could be clamped in place by pneumatically controlled locking pins (not shown) or other suitable means. The proximal end of the mandrel unit is closed off by a protective screen or drum guard 70 in order to prevent accidental entry into the rotating mandrel unit.

Finally, a control panel 72 is located at the proximal or drive end of the mandrel unit within easy access to the operator. Control panel 72 controls the first power cylinder units 62, the power door locking units (not shown) as well as the end cap locking actuators (not shown). These various functions are controlled when the mandrel unit is at rest, either prior to or after completion of the molding operation.

Figure 5:
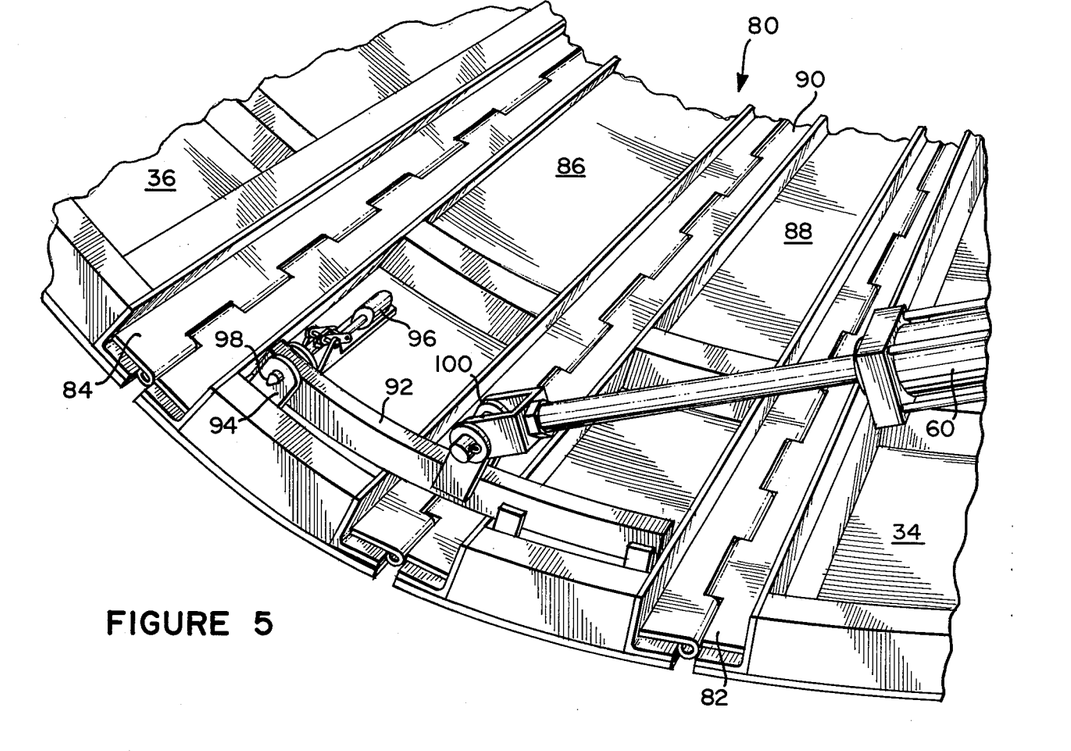
FIG. 5 is a fragmentary perspective view of an alternative embodiment of the door unit shown in FIG. 4 in its closed position.
Figure 6:
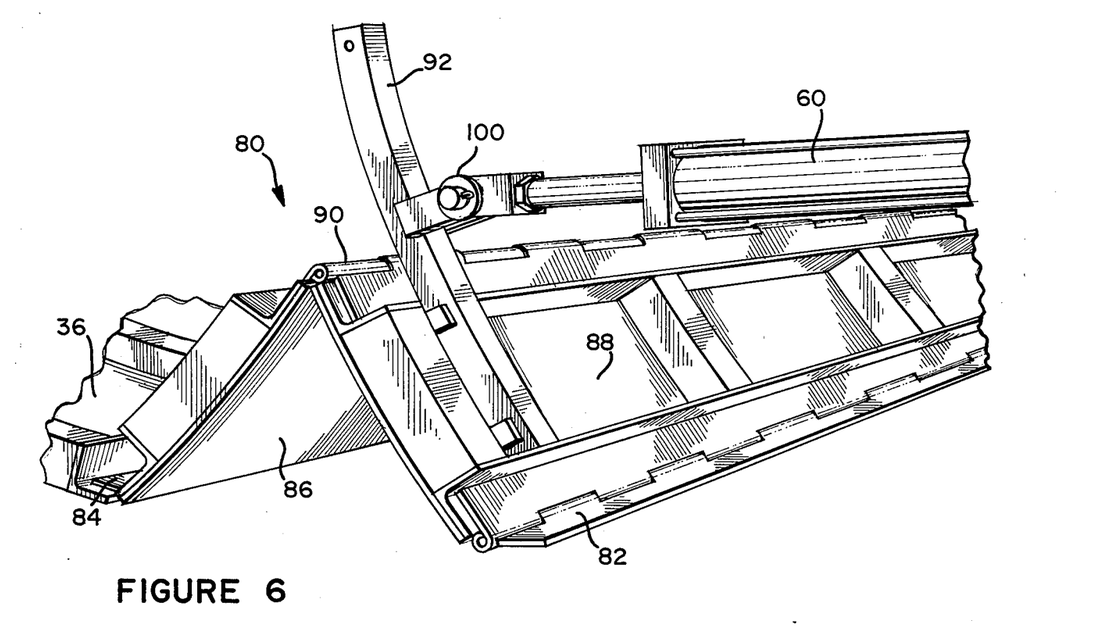
FIG. 6 is a fragmentary perspective view showing the door unit of FIG. 5 in its opened position.

FIGS. 5 and 6

FIGS. 5 and 6 show an alternative arrangement for the door section 38 shown in FIGS. 3 and 4. This embodiment provides a pivotal door section 80 which is attached by means of hinge 82 to support cylinder half section 34 at one adjacent edge thereof, while the opposite adjacent edge is connected by means of hinge 84 to secondary cylinder half section 36. Door section 80 is comprised of two half sections 86 and 88 which are interconnected along their adjacent longitudinal edges by means of a central hinge 90. Locking bar 92 is integrally connected to door half section 88 extending transversely thereacross and engageable with a bracket 94 which in turn is connected to door half section 86. Locking bar 92 may be temporarily secured within bracket 94 by means of a power actuator 96 which is fastened to door half section 86. Power actuator 96 allows insertion and retraction of locking pin 98 into and out of engagement with bracket 94 and locking bar 92. First power cylinder unit 60 is connected at the approximate midpoint of locking bar 92 by means of a clevis and pin arrangement 100. While the arrangement shown in FIGS. 5 and 6 is described in conjunction with a single door section 80, identical structure would be found in each of the adjacent door sections 80 (not shown) forming the entire door structure of the assembled mandrel unit.

After power actuator 96 has been operated to release locking bar 92 from bracket 94, the first power cylinder unit 60 is then actuated causing door half sections 86 and 88 to pivot inwardly thereby causing simultaneous pulling of support cylinder half section 34 and secondary cylinder half section 36 toward each other so as to cause collapsing of the mandrel unit. The inward pivotal movement of door half sections 86 and 88 is shown in FIG. 6.

It should be noted in FIGS. 5 and 6, first power cylinder unit 60 combines the functions of door opening as well as mandrel collapsing while in the embodiment shown in FIGS. 3 and 4, these functions were performed by independently operated first power cylinder units 60 and second power cylinder units 62.

Figure 7:
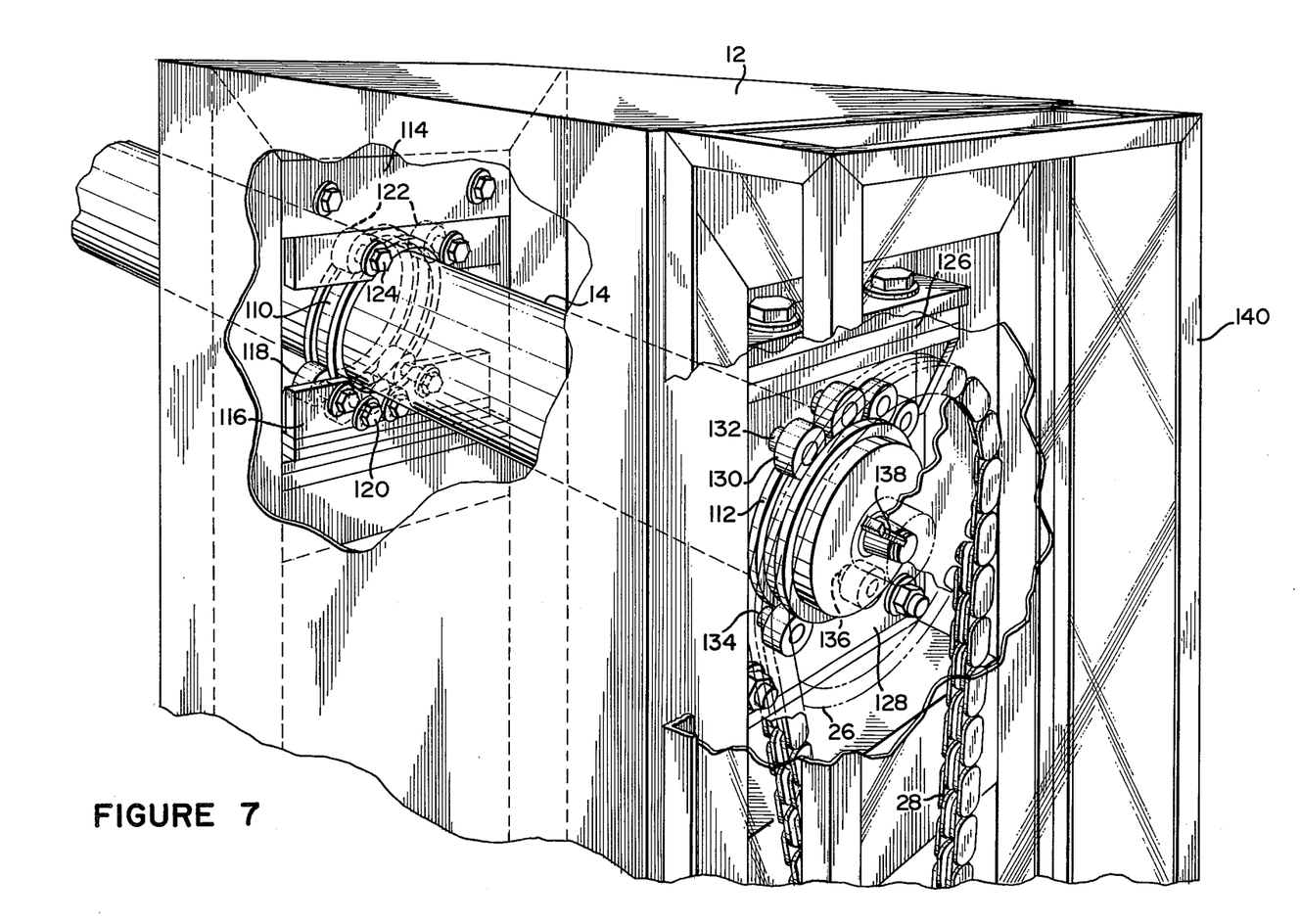
FIG. 7 is a fragmentary perspective view of the upper end portion of the vertical support tower partially broken away to show the bearing and drive assemblies.

FIG. 7

FIG. 7 shows the upper end portion of vertical support tower 12 wherein the proximal or drive end of cantilevered shaft 14 is supported for rotation. Integrally secured to cantilevered shaft 14 is a circular shaped forward bearing race 110 and a correspondingly shaped rearward bearing race 112. Races 110 and 112 are preferably made from hardened steel. A forward sectional bracket including adjustable upper half section 114 and lower half section 116 are connected by welding or other suitable means to support tower 12. A plurality of primary rollers 118 are arcuately mounted in lower half section 116 so as to engage forward race 110 from below. Primary rollers 118 are secured to lower half sections 116 by means of bolts 120. A pair of secondary rollers 122, shown in dotted lines, are arcuately mounted in upper half section 114 so as to engage forward race 110 from above. The secondary rollers are secured to upper half section 114 by means of bolts 124.

Secured to the upper end portion of support tower 12 is a rearward sectional bracket comprising upper half section 126 and adjustable lower half section 128. A plurality of primary rollers 130 are arcuately mounted in upper half section 126 so as to engage rearward race 112 from above. Primary rollers 130 are mounted upon bolts 132 which pass through upper half section 126. A pair of secondary rollers 134 are arcuately mounted in lower half section 128 so as to engage rearward bearing race 112 from below. Secondary rollers 134 are mounted upon bolts 136 which pass through lower half section 128.

Sprocket 26 is positioned on the proximal end of shaft 14 and is secured in place by means of keyway 138. Drive belt 28 interconnects sprocket 26 with a second motor driven sprocket (not shown). A glass or wire mesh covered protective cage 140 encloses the rotating elements thereby providing additional safety to the operators of the mandrel assembly.

In the arrangement shown in FIG. 7, primary rollers 118 and 130 carry the majority of the weight of cantilevered shaft 114 and the assembled mandrel unit supported thereon, while secondary rollers 122 and 134 serve to reduce deflection and excessive vibration of cantilevered shaft 14 while it is rotating. Thus, the novel bearing assembly has two primary functions. First, it provides suitable means for carrying the weight of the cantilevered assembly and for transferring the weight through vertical support tower 12 to the base frame. Second, the bearing assembly functions to eliminate undesirable vibrational forces resulting from the rotating mass.

OPERATION

The mandrel assembly being modular in construction, is easily transported from the manufacturer to the final shipping destination, thus eliminating the need for special shipping permits and convoy escorts normally required for oversized loads, further reducing transportation costs. Once the assembly has reached its destination, the first modular mandrel section 22 is mounted upon cantilevered shaft 14 and integrally connected thereto by welding or other suitable means. Each succeeding modular mandrel section 22 is likewise mounted upon cantilevered shaft 14 and aligned with its adjacent modular mandrel section. Adjacent modular mandrel sections are welded together so as to form the assembled mandrel unit 20 having a continuous exterior molding surface 24 and a longitudinal and aligned internal truss configuration as shown in FIG. 4. The tension-integrity configuration of the internal reinforcing elements insures total dimentional stability of the mandrel assembly. This structural configuration is essential for minimizing deflection of cantilevered shaft 14 between its drive or proximal end and its free or distal end.

In use, cantilevered shaft 14 and expanded mandrel unit 20 supported thereon are caused to rotate by activating the motor drive (not shown) from control panel 32. While mandrel unit 20 is rotating, a resinous material is applied to the entire area of exterior molding surface 24. Next, the motor drive (not shown) is deactivated from control panel 32 causing mandrel unit 20 to come to a standstill.

Release of the hardened molded article from mandrel unit 20 is effected by collapsing the mandrel assembly in the manner shown in FIG. 4. First, door unlocking solenoids or pneumatic cylinders (not shown) are actuated from control panel 72 so as to disengage the sliding bolts (not shown) from bolt engaging members 68. Next, first power cylinder units 60 are actuated from control panel 72 causing door sections 38 to be pivoted inwardly toward cantilevered shaft 14. Next, second power cylinder units 62 are activated from control panel 72, collapsing secondary cylinder half sections 36 toward support cylinder half sections 34, thereby reducing the diameter of mandrel unit 20. In this collapsed state, the molded article may be removed from the distal end of the mandrel assembly.

The above steps are repeated in reverse order so as to expand the mandrel assembly to its original size. This is accomplished by reactivating second power cylinder units 62 causing expansion of secondary cylinder half sections 36 away from support cylinder half sections 34. Next, first power cylinder units 60 are actuated causing door sections 38 to pivot about hinge 42 in a direction away from cantilevered shaft 14. After door sections 38 have been fully pivoted to their closed position, the door latching mechanism (not shown) are actuated so as to prevent further movement of the door sections. Mandrel unit 20 is once again in a condition suitable for the molding of additional articles thereon.

The embodiment shown in FIGS. 5 and 6 provides a simplified and improved door structure whereby the collapsible mandrel unit may be expanded or contracted without losing direct mechanical communication between the two cylinder half sections 34 and 36. This arrangement reduces undesirable vibrations caused by dramatic transfer of stress, and asymmetrical shifting of mass from one area of the mandrel to another during expansion and contraction thereof. The door arrangement shown in FIGS. 5 and 6 pivots about three independent hinges 82, 84 and 90, as contrasted to the embodiment of FIG. 4 wherein the door section pivoted about a singular hinge 42. Each of these hinges extends the length of the mandrel assembly. While only a single power actuator 96, locking bar 92 and power cylinder unit 60 has been shown in FIGS. 5 and 6 for the purpose of clarity, in actuality, a plurality of these elements are spaced apart along the entire length of the mandrel assembly.

In operation, power actuators 96 are activated causing retraction of pins 98 from locking bars 92 and brackets 94. Next, power cylinder units 60 are actuated thereby exerting an inward pull on the door assembly at points closed to interior hinge 90 causing door half sections 86 and 88 to pivot inwardly simultaneously pulling hinge secondary cylinder half sections 36 and support cylinder half section 34 toward each other. In this state, the diameter of the mandrel unit has been reduced a sufficient amount so as to allow the subsequent withdrawal of the molded article therefrom. Once the molded article has been completely removed, the mandrel unit is once again expanded by reversing the above steps.

The embodiment shown in FIGS. 5 and 6 provides a dramatic increase in the rigidity of the entire mandrel and virtually eliminates the undesirable vibrations associated with collapsing and expanding of the mandrel cylindrical half sections. In addition, the embodiment of FIGS. 5 and 6 dramatically reduces wear on the internal power cylinder units. Furthermore, safety of the operator is enhanced by the elimination of a shearing action resulting from the operation of the door units shown in the FIG. 4 embodiment. The latter embodiment also provides a means for maintaining direct and positive mechanical communication between the two opposed cylinders half sections, throughout the mandrel expanding and contracting operations.

While this invention has been described as having a preferred design, it will be understood that it is capable of further modification. This application is, therefore, intended to cover any variations, uses, or adaptations of the invention following in general principles thereof and including such departures from the present disclosure as come within known or customary practice in the art to which this invention pertains, and as may be applied to the essential features hereinbefore set forth and fall within the scope of this invention or the limits of the claims.

What is claimed is:

1. A rotatable mandrel for forming cylindrically shaped moulded articles and a support therefor comprising:
   (a) a base frame,
   (b) a vertical support tower having upper and lower end portions, said lower end portion being secured to said base frame,
   (c) a cantilevered shaft rotatably positioned within said upper end portion of said vertical support tower and extending horizontally outwardly in a direction parallel to and above said base frame,
   (d) a collapsible rigid-walled cylindrical mandrel mounted on and rotatable with the cantilevered shaft,
   (e) bearing means at the upper end portion of the vertical support tower for receiving the support end of said cantilevered shaft and transmitting the weight of said collapsible mandrel supported thereon through said vertical support tower to said base frame,
   (f) means for imparting rotation to said cantilevered shaft and to said collapsible mandrel positioned thereon,
   (g) the mandrel having a smooth outer circumferential surface formed by two opposed rigid arcuate support cylinder half sections hinged along one of their common longitudinal edges, and a narrow elongated arcuate pivoted door section bridging a longitudinally extending gap between the other edges of the half sections and pivotally connected to at least one of the spaced free edges of the half sections so as to swing radially inward whereby the half sections can move toward each other to reduce the diameter of the circumferential surface and permit removal of the molded article,
   (h) power means for collapsing and expanding said collapsible mandrel sections whereby removal of the molded article formed thereon is facilitated and subsequently reexpanded to the full circumferential length with a high degree of reproducability each time the mandrel is operated.

2. A mandrel and support therefor as set forth in claim 1, wherein:
   (a) one of the arcuate half sections being a support cylinder half section which is rigidly attached to the cantilevered shaft, and
   (b) the pivoted door section being movable inwardly toward the cantilevered shaft to permit the other arcuate secondary cylinder half section to collapse inwardly radially toward the support cylinder half section.

3. A mandrel and support therefor as set forth in claim 1, wherein:
   (a) a cylindrical mandrel is composed of a plurality of identical side by side aligned and rigidly attached modular mandrel sections.

4. A mandrel and support therefor as set forth in claim 3 and wherein:
   (a) said collapsible modular mandrel sections including a support cylinder half section, a secondary cylinder half section hinged at one end to said support cylinder half section and a pivotal door section interconnecting opposite edges of said support cylinder half section and said secondary cylinder half section,
   (b) said support cylinder half section, said secondary cylinder half section and said door section forming a cylindrically shaped modular mandrel section,
   (c) said pivotal door section movable inwardly toward said cantilevered shaft thereby permitting said secondary cylinder half section to be collapsed toward said support cylinder half section, and
   (d) said support cylinder half sections, said secondary cylinder half sections and said door sections of adjacent modular mandrel sections being in longitudinal alignment.

5. A mandrel and support therefor as set forth in claim 2, and wherein:
   (a) said support cylinder half section, said secondary half section and said pivotal door section each has opposite side edges, (b) said support cylinder half section including a pair of centrally located concentric rings for supporting said collapsible mandrel section upon said cantilevered shaft, (c) a plurality of fixed spokes extending radially from each of said concentric rings to respective side edges of said support cylinder half section, (d) a plurality of diagonal trusses interconnecting adjacent radially extending spokes, and (e) said radially extending spokes of equal length.

6. A mandrel and support therefor as set forth in claim 5 and wherein:

(a) said secondary half section including an off centered support bar, (b) a plurality of secondary spokes extending from each end of said support bar outwardly to respective edges of said secondary half section, and (c) said secondary spokes being of various lengths.

7. A mandrel and support therefor as set forth in claim 2 and wherein:

(a) said means for collapsing and expanding said collapsible mandrel sections including first power cylinder means for controlling pivotal movement of said door sections and second power cylinder means for collapsing said secondary cylinder half sections toward said support cylinder half sections, (b) said secondary cylinder half sections being collapsed toward said support cylinder half sections by said second power cylinder means after said door sections have been pivoted inwardly toward said cantilevered shaft by said first power cylinder means, and (c) said second power cylinder means for expanding said secondary cylinder half sections away from said support cylinder half sections prior to said door sections being pivoted outwardly away from said cantilevered shaft, by said first power cylinder means.

8. A mandrel and support therefor as set forth in claim 2 and wherein:

(a) the mandrel having a plurality of collapsible modular mandrel sections positioned in side-by-side relation upon said cantilevered shaft, (b) said trusses and said secondary spokes of adjacent collapsible modular mandrel sections being in longitudinal alignment, and (c) adjacent collapsible modular mandrel sections being welded together.

9. A mandrel and support therefor as set forth in claim 1 and wherein:

(a) said bearing means for transmitting the weight of said cantilevered shaft and said collapsible mandrel supported thereon including circular forward and rearward hardened steel bearing races integral with said cantilevered shaft on said end of said shaft positioned within said upper end portion of said vertical support tower, (b) an adjustable forward sectional bracket integral with said upper end portion of said vertical support tower including an upper half section and a lower self section positioned generally above and below said forward bearing race respectively, (c) an adjustable rearward sectional bracket integral with said upper end portion of said vertical support tower including an upper half section and a lower half section positioned generally above and below said rearward bearing race respectively, (d) a plurality of primary rollers arcuately mounted in said lower half section of said forward bracket and engaging said forward steel race from below, (e) secondary rollers arcuately mounted in said upper half section of said forward bracket and engaging said forward steel race from above, (f) a plurality of rollers arcuately mounted in said upper half section of said rearward bracket and engaging said rearward steel race from above, (g) secondary rollers arcuately mounted in said lower half section of said rearward bracket and engaging said rearward steel race from below, and (h) the majority of weight being carried by said primary rollers and transmitted through said vertical support tower to said base frame.

10. A mandrel and support therefor as set forth in claim 9 and wherein:

(a) said primary rollers arcuately mounted in said lower half section of said forward bracket opposing forces acting downwardly thereupon, and (b) said primary rollers arcuately mounted in said upper half section of said rearward bracket opposing forces acting upwardly thereupon.

11. A mandrel and support therefor as set forth in claim 1 and wherein:

(a) said door is pivotable about a hinge assembly connected to and extending the length of said support cylinder half section, and (b) means for locking and unlocking said door to said secondary cylinder half section.

12. A mandrel and support therefor as set forth in claim 7 and wherein:

(a) said door including a pair of edge hinges permanently secured to said support cylinder half section and to said secondary cylinder half section respectively, and a central hinge between said edge hinges and dividing said door in half, and (b) said first power cylinder means for controlling pivotal movement of said door causing said central hinge to move inwardly toward said cantilevered shaft and thereby causing said secondary cylinder half section to collapse toward said support cylinder half section.

* * * * *